Feb. 15, 1966  A. F. CUMMINGS  3,234,988
COLLAPSIBLE LOAD BEARING WHEEL STRUCTURE
Filed Sept. 3, 1963  2 Sheets-Sheet 1
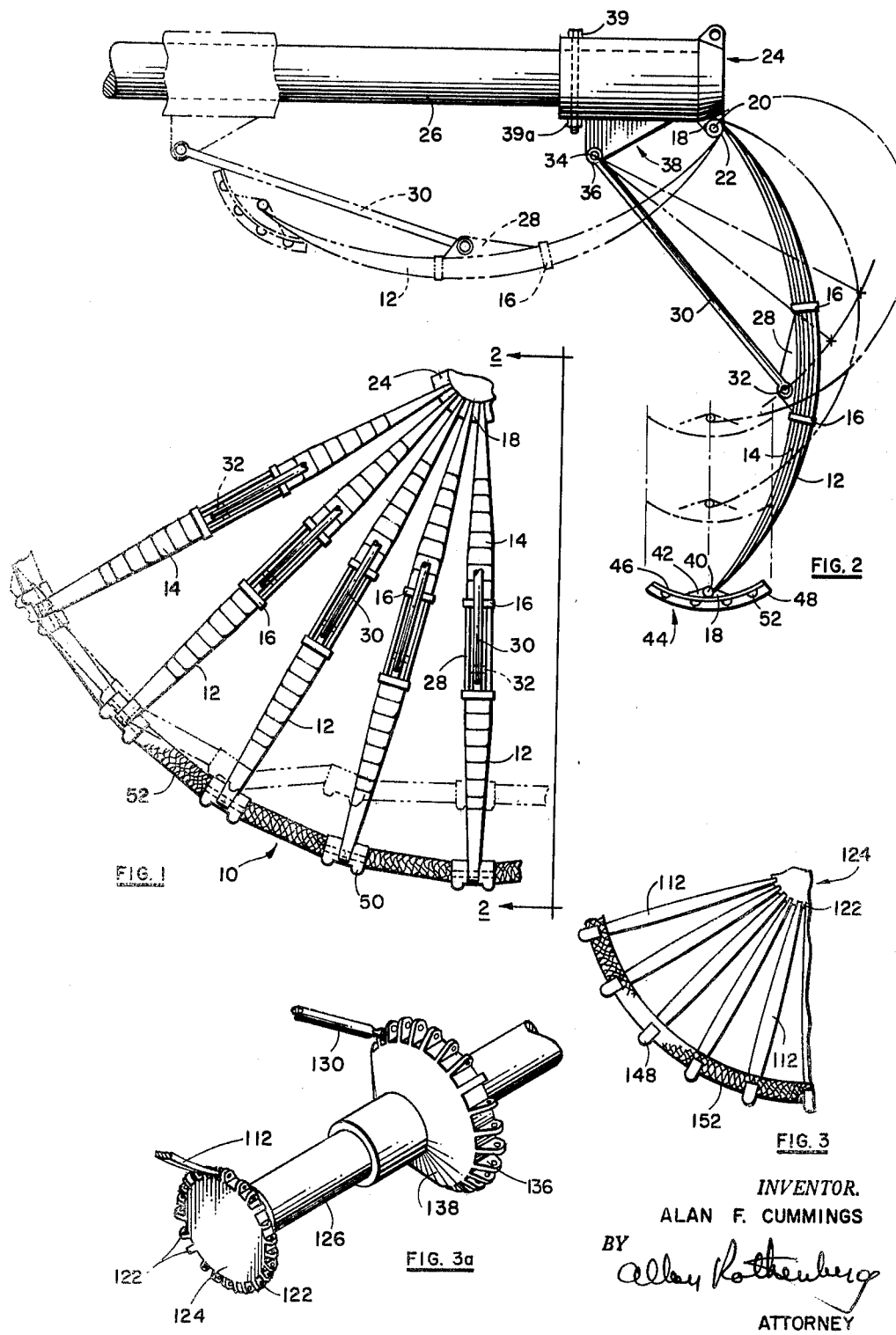
INVENTOR.
ALAN F. CUMMINGS
BY
ATTORNEY

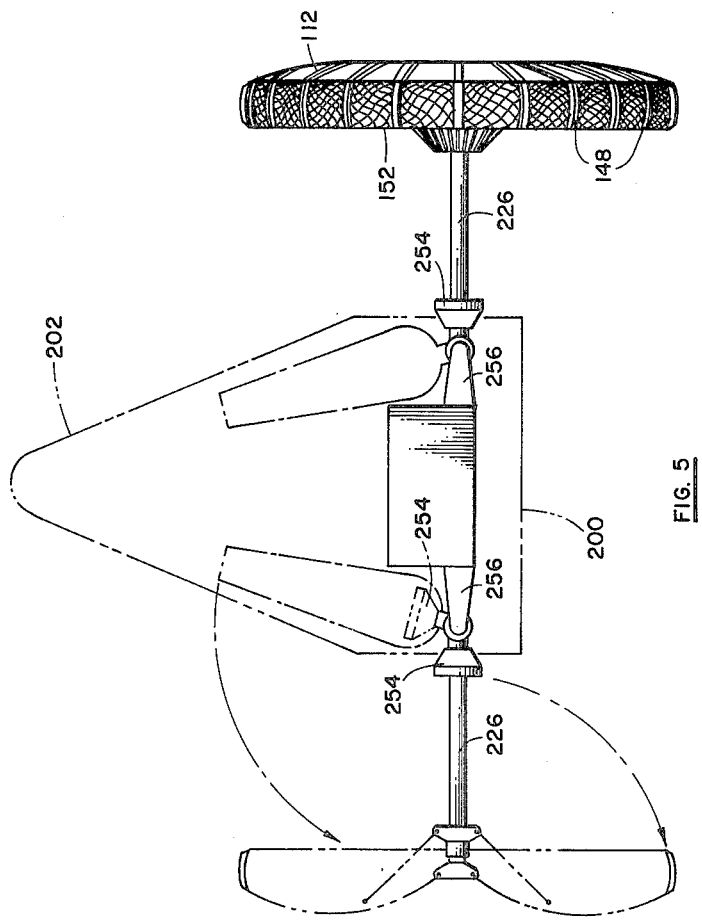
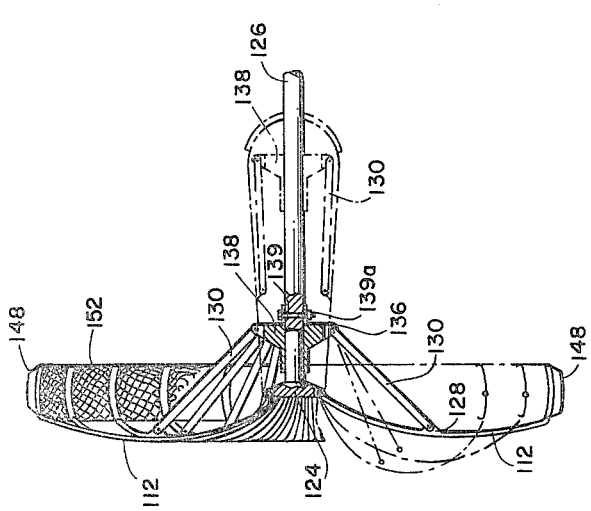

United States Patent Office 3,234,988
Patented Feb. 15, 1966

3,234,988
COLLAPSIBLE LOAD BEARING WHEEL STRUCTURE
Alan F. Cummings, Downey, Calif., assignor to North American Aviation, Inc.
Filed Sept. 3, 1963, Ser. No. 306,041
13 Claims. (Cl. 152—12)

This invention relates to load bearing structures and more particularly to a load bearing structure that provides resilient support of a load by mechanical means.

In conventional mechanical structures designed to resiliently support a load and comprised of a rigid load-carrying base member and one or more resilient support elements, movement of the base member and the load carried thereby toward the supporting surface, either as a result of an increase in load on the base member or the effect of dynamic forces on the base member and the load, causes each of the support elements to exert a force opposing such movement that increases as the base member and load move toward the supporting surface. An example of a load bearing structure having support elements which act in this manner is one consisting of a base member that is supported on helical coil springs the resistive forces of which vary directly with displacement. In contrast with such devices, a load bearing structure constructed in accordance with the principles of the invention comprises a load-carrying base member which is supported by a plurality of support elements each of which exerts a predetermined, relatively constant force against a supporting surface irrespective of the movement of the load-carrying base member toward the supporting surface because of either increase in load or the effect of dynamic forces thereon. A feature of a load bearing structure constructed in accordance with the principles of the invention is that an increasing number of its support elements is brought into contact with the supporting surface as the load-carrying base member moves toward this surface. Therefore, through selection of the constant resistive forces that each of the support elements of the load bearing structure will exert in opposition to movement of the base member toward the supporting surface, and through selection of the number of such elements which will be in contact with the supporting surface at any particular displacement of the base member toward the supporting surface, it is possible to provide a selected variation of the total force that will be exerted by the collective action of the support elements as the base member moves toward the supporting surface. Thus a controlled linearity or non-linearity of spring rate is available. Each of the support elements of the load-bearing structure, however, will exert a relatively constant force upon the surface upon which it rests irrespective of the displacement of the base member toward the supporting surface. The arrangement of the support elements of a load bearing structure constructed in accordance with the principles of the invention thus provides a means of varying the resilience of a load bearing structure in a manner not heretofore achieved. Furthermore, the support elements of this novel load-bearing structure can be so designed that the pressure upon any part of surface supporting the structure and its load will not exceed the maximum safe bearing pressure of the surface.

It has also been found that a wheel constructed in accordance with the principles of the invention has considerable advantage over known wheels designed to provide resilient support for a vehicle by means of a mechanical construction. A wheel utilizing principles of the invention has a superior capability to traverse irregular ground and roll over large obstacles, and, while light and strong in construction, can be mechanically collapsed for convenient packaging and storage in a limited space. These features make such a wheel particularly advantageous for use in connection with vehicles which must be stored in a limited space until they are used and which are to be used on unimproved surfaces, such as vehicles used in explorational activities.

Accordingly it is a broad object of the invention to provide a load-bearing structure having support elements that exert a substantially constant supporting force. This object, as well as others named hereafter, is achieved by a load bearing structure having a base member on which is mounted a plurality of support elements formed of slender columns each adapted to deflect under the application of its Euler load so that the load borne by each element is substantially constant. It is known that a slender column subjected to its Euler load will thereafter undergo a relatively large deflection with very slight increase of load and, conversely, will exert a substantially constant resistive force in opposition to such deflection within the elastic limit of the colmun. In accordance with the invention, the number of slender columns and the Euler loads thereof are selected so that the total of the resistive forces of the columns when subjected to their Euler loads is greater than the maximum expected load that will be borne by the columns. By selection of individually varying Euler loads for one or more of the slender columns, or by selection of the number of such columns which come into contact with, and exert relatively constant resistive forces against, the supporting surface as motion of the base member toward such surface proceeds, or by a combination of such selections, the rate of change of total resistive force of the columns with respect to displacement of the load-carrying base member can be varied over a wide range.

It is an additional object of the invention to provide a load-bearing structure having support elements that can be designed to exert collectively a predetermined force when the load-carrying base member of the structure has been moved, because of the effect of load or dynamic forces, a given distance toward a surface supporting the load-bearing structure.

Another object of the invention is to control the spring rate of a resilient device.

It is another object of the invention to provide a wheel that can be collapsed for convenient storage in a limited space when it is not in use.

It is still another object of the invention to provide a wheel having an improved cushioning action and ability to roll over large obstacles.

These an other objects of this invention will be apparent in the light of the following description and drawings wherein:

FIG. 1 is a view of a segment of a wheel constituting a preferred embodiment of the invention, with dotted lines illustrating five support elements of the wheel in deflected positions resulting from loading, FIG. 2 is a fragmentary sectional view of the wheel of FIG. 1, with dotted lines illustrating a support element of the preferred embodiment of the invention in two deflected positions resulting from loading and a third position in which it is folded adjacent to the axle of the wheel, FIGS. 3 and 3a are views of components of a lightweight wheel constituting a second embodiment of the invention, FIG. 4 is a fragmentary sectional view of the wheel of FIG. 3, with dotted lines illustrating a support element of the second embodiment of the invention in two deflected positions resulting from loading and a third position in which it is folded adjacent to the axle of the wheel, and FIG. 5 is a view illustrating the use of the embodiment of FIG. 3 with a vehicle capable of being transported in a spacecraft, with dotted lines illustrating the configuration of the embodiment when folded and retracted inside the spacecraft during launch.

Throughout the description and drawings like reference numerals refer to like parts.

As illustrated in FIG. 1, a wheel, generally designated at 10 and comprising a preferred embodiment of the invention, is provided with a plurality of radially disposed support elements or spokes generally designated at 12. Dotted lines in FIG. 1 represent the deflected positions of some of the spokes 12 when the wheel is supporting the load that is expected to be the average or normal load carried by the wheel. In FIG. 2 it can be seen that each of the spokes 12 is comprised of a plurality of leaves 14 held together by means of two bands 16 medially positioned thereon. The leaves are formed with gradually decreasing length and increasing width so that the cross-section of a spoke is maximum at its center where the bending moment resulting from loading of the wheel will be maximum. As can be seen in the same figure, the ends of the spokes are bent into a loop 18 to provide for a pivotal pin connection of the spokes to other components of the wheel. Dotted lines in FIG. 2 represent deflections of a spoke under two conditions, namely, a deflection corresponding to the anticipated normal load and a second deflection resulting from a maximum loading or from dynamic forces acting on the wheel. One end of each spoke is pivotally connected by means of a pin 20 to one of a plurality of lugs 22 integral with and evenly spaced around the periphery of a base member or hub, generally designated at 24, that is in turn integral with an axis 26. The two bands 16 of each spoke are attached to respective ends of a connecting lug 28 perpendicularly disposed to the surface of the adjacent leaf of the spoke. The connecting lug 28 may also be fixed to the adjacent leaf of the spoke where the deflection which the spoke undergoes when loaded is not adversely restricted by such arrangement. A link 30 is pivotally connected by means of a pin 32 to each of the connecting lugs 28, with the other end of each link being pivotally connected by means of another pin 34 to one of a plurality of lugs 36 integral with and evenly spaced around the periphery of a sleeve, generally designated at 38, which is slidably mounted on the axle 26. The sleeve 38 may be locked against the hub 24 by means of a bolt 39 which passes through holes in said sleeve and the axle 26 and is secured with a nut 39a. The outer end of each spoke 12 is pivotally connected by means of a pin 40 to a lug 42 of a shoe, generally designated at 44, that comprises a curved plate 46 and a cleat 48 attached to said plate by suitable means, such as cement or rivets. The cleats, formed with ridges 50 as illustrated in FIG. 1, coact with a foldable tread 52, which is attached to the shoes 44 and extends circumferentially around the spokes, to improve the support and traction of the wheel on a variety of surfaces. As illustrated in FIG. 2, the tread 52 may be conveniently attached to the shoes 44 by locking it between the plates 46 and cleats 48 attached thereto.

The leaves 14 forming the spokes of the wheel illustrated in FIGS. 1 and 2 are made of steel. The spokes may be formed of other materials, however, such as, for example, aluminum, laminated plastic materials including fiberglass, or sandwich honeycomb core materials where a light construction is desirable. In general, materials having a low modulus of elasticity will be most suitable for the spokes. In some instances monolithic rather than leaf type spokes may be employed to advantage. With the exception of the cleats 48, which are formed of hard rubber, all of the other components of the wheel illustrated in FIGS. 1 and 2 are also made of steel. The tread 52 comprises a reticulated, foldable chain link material which will increase traction on a variety of surfaces. It will be recognized that a great variety of materials may be used in place of steel in the construction of the hub 24 and axle 26, link 30, sleeve 38, and the shoe 44 and tread 52 assembly, including, for example, aluminum and plastic materials. The rubber cleat 48 may likewise be replaced with steel or plastic cleats. The cleats may be grooved, spiked or knobbed to provide improved traction. The tread 52 may be constructed of a fabric or closely braided wire sheet rather than an open type material. Thus it is seen that details of construction may be varied considerably without departing from the scope of the invention.

It was previously mentioned that a load bearing structure constructed in accordance with the principles of the invention is supported by support elements each of which exerts a predetermined, relatively constant force against a supporting surface irrespective of the movement of the load toward the supporting surface because of either increase in load or the effect of dynamic forces. In the embodiment of the invention illustrated in FIGS. 1 and 2 this feature of operation is achieved under control of the tread 52, the perimeter of which is of such size that all of the spokes 10 are deflected to the position represented by solid lines in FIG. 2 when the spokes are in their operable position extending radially of the hub of the wheel. The effect of this arrangement of the tread is to pre-load each spoke to its Euler load before it bears a share of any payload carried by the wheel (payload as used here includes the weight of the wheel itself). The pre-load on a spoke which is applied by the tread is replaced by the external reaction of the supporting surface when the wheel is supporting a payload. Therefore, subsequent deflection of a spoke under loading will occur along that portion of the load-deflection curve for the spoke where the load borne by the spoke, or conversely, the resistive force exerted by the spoke against a supporting surface, is substantially constant irrespective of further deflection of the spoke. In FIG. 2 two deflected positions of a spoke 12 under different loading of the wheel 10 are represented by dotted lines (typical deflection and maximum deflection). The solid lines represent zero payload position. Because the links 30 are pivotally connected to the spokes and sleeve 38, they do not interfere with the deflectional movement of the spokes under loading. From the above discussion it will be understood that the force exerted against a supporting surface by the shoe 44 of the spoke will be substantially the same for each of the two positions represented by the dotted lines as it is at the initial zero-payload position. As a consequence of this arrangement, the wheel 10 possesses superior cushioning characteristics and ability to traverse irregular ground not heretofore attained with known wheel configurations. It will be recognized that the pivotal connection of the shoes 44 to the spokes also enhances the performance of the wheel on irregular terrain, since each shoe can tilt to conform with and grip the ground supporting it. The pivotal connection of the shoes to the spokes also provides the advantage that the shoes will be maintained substantially parallel to the supporting surface when the spokes are in various deflected positions resulting from loading of the wheel.

Reference has also previously been made to the ability of a wheel constructed in conformance with the principles of the invention to collapse and thus be readily stored in a limited space. A compact geometric relation of the spokes 12, links 30, sleeve 38 and shoes 44 when the wheel is in a collapsed configuration may be accomplished by merely removing the bolt 39 and sliding the sleeve 38 along the axle 26 in the direction away from the hub 24. Movement of the sleeve away from the hub obviously causes the links 30 to pivot about both the hub and the sleeve to a position wherein both the links and spokes lie substantially parallel to the axle. This folded configuration of the wheel components is represented by dotted lines in FIG. 2. When the wheel has been collapsed, the tread 52 can be folded between adjacent spokes and wrapped in overlapping relation around the shoes 44 so as to provide a compact assembly of components that can be conveniently stored and quickly returned to the operational position wherein the spokes extend radially of the axle.

A practical method for designing the spokes 12 for a wheel of the type described can readily be understood through consideration of the following sample calculations, which are based on a wheel arbitrarily assumed to have a diameter of about six feet and which is to be capable of supporting a 1000 pound load. For a wheel of this size the number of spokes is tentatively selected as 24, and since the spokes are formed of steel a modulus of elasticity of $28 \times 10^6$ p.s.i. and an allowable of 120,000 p.s.i. are assumed. A preliminary layout of the wheel can be used to show, as in FIG. 2, the desired or acceptable deflection of a spoke under the load that the wheel will normally carry, and a second deflection that is the maximum permissible as a result of an increased load or dynamic forces acting on the wheel. The maximum deflection of a spoke should be shown in the preliminary layout as that which appears to be desirable with respect to the height of obstacles which the wheel may be expected to roll over, the maximum deflection which a spoke may be expected to undergo without exceeding the proportional limit of the material selected for the spoke, and the general geometric relation of the link 30 and sleeve 38 wheel folding mechanism. It will be seen in FIG. 2 that the maximum spoke deflection is equal to approximately one-half the distance between the ends of a spoke when it bears no load other than that imposed by the tread. A deflection of this magnitude is not extreme for any of the materials cited above as suitable for use as spokes. It will also be noted in FIG. 2 that the ends of the spokes lie in the same plane at all deflected positions thereof, that is, the axes of pivot pins 18 lie in a single plane throughout all deflected positions. When the wheel is in use on irregular terrain the shoes 50 which are in contact with the supporting surface may cause the ends of the spoke to which they are attached to deviate to some extent from this planar mode of deflection. However, although the spokes will undergo true Euler load deflection only when their ends are in the same plane, a small deviation of the ends out of a common plane will not seriously affect the cushioning action of the spokes. A second preliminary layout can be used to show, as in FIG. 1, the number of shoes in contact with the supporting surface when a spoke having ends lying in a plane normal to said surface has undergone the deflection represented in the other layout as typical under normal loading of the wheel. As seen in FIG. 1, when the wheel is supporting a load the tension of the tread 52 will cause inward deflection of one or more spokes even before the shoes connected thereto contact the supporting surface. Consequently, some allowance for this "tread action" must be made in determining the number of shoes in contact with the supporting surface for a particular deflection of a spoke. Tread tension will minimize the effect of forces which act on the shoes so as to cause deviation of the ends of spokes from the same plane.

A graphical means of determining the radius of curvature of a spoke at maximum deflection is provided by the above described preliminary wheel layout which corresponds to FIG. 2. If the maximum spoke deflection is to be as extreme as that represented by the upper dotted lines in FIG. 2, it will be seen in that figure that the radius of curvature of a spoke will be less than the moment arm of the force which, acting on the shoe 44, causes deflection of the spoke. In the sample calculations of spoke size given below, the radius of curvature of a spoke at maximum deflection will be assumed to be 10 inches and the moment arm of the force causing this deflection will be assumed to be 12 inches. It will also be assumed that the other preliminary wheel layout which corresponds to FIG. 1 indicates that the number of spokes in contact with the supporting surface under an assumed normal static load of 1000 pounds will be, as in FIG. 1, three spokes. The load supported by each spoke will be 333 pounds, which is the Euler load supported by each spoke irrespective of its deflection.

Spoke thickness under the assumed conditions and physical constants for the spokes can be found as follows:

Spoke thickness =
$$\frac{2(\text{allowable stress})(\text{radius of curvature max. deflection})}{\text{modulus of elasticity}}$$

$$= \frac{2(125{,}000 \text{ lb./in.}^2)(10 \text{ in.})}{28 \times 10^6 \text{ lb./in.}}$$

$$= 0.09 \text{ inch}$$

Spoke width for the same conditions and physical constants can be found as follows:

Spoke width =
$$\frac{6(\text{maximum bending moment acting on spoke})}{(\text{spoke thickness})^2 (\text{allowable stress})}$$

$$= \frac{6(333 \text{ lb.} \times 12 \text{ in.})}{(0.09 \text{ in.})^2 (125{,}000 \text{ lb./in.}^2)}$$

$$= 24 \text{ inches}$$

The required width can be obtained in a spring comprising twelve leaves each two inches wide. It will be understood by persons skilled in the art that the width of the spokes can be varied along their length to attain the required strength and deflection geometry with uniform bending stress at maximum deflection.

The well-known Euler formula may be used to determine whether there is agreement between the theoretical Euler load of a spoke of the size found as described above and the 333 pound spoke load on which the calculations were based. Euler load stress on a spoke is given by the following equation:

$$\text{Spoke stress} = \frac{\pi^2 E}{\left(\frac{I}{r}\right)} = \frac{P}{a}$$

Where:
$P$ = Euler load on spoke
$a$ = area of spoke
$E$ = modulus of elasticity
$I$ = length of spoke before bowling occurs
$r$ = radius of gyration of spoke It can be shown that the radius of gyration of a spoke is equal to the thickness of the spoke times 0.289, and this relationship will be used in the following sample calculation of the theoretical Euler load for a spoke of the size previously determined, namely a spoke having a thickness of 0.09 inch. The length of a spoke before deflection occurs will be assumed to be 36 inches. Consequently, spoke stress is given by the following calculations:

$$\text{Spoke stress} = \frac{(3.1416)^2 (28 \times 10^6 \text{ lb./in.}^2)}{\left(\frac{36 \text{ in.}}{0.289 \times 0.09 \text{ in.}}\right)^3}$$

$$= 143 \text{ lb/in.}^2$$

The theoretical Euler load for the spoke is then determined as follows.

Euler load of spoke = $(143 \text{ lb./in.}^2)(\text{area of spoke})$
$= (143 \text{ lb./in}^2)(0.09 \text{ in.} \times 24 \text{ in.})$
$= 310$ pounds It will be seen that the theoretical Euler load of a spoke of the size determined as described above is approximately the same as the load used in calculating the dimensions of the spoke.

From the preliminary layout of the wheel it may be found, as an illustration, that at maximum spoke deflection five spokes will support the load. The maximum load will then be, of course, 333 pounds times five or 1,670 pounds.

Tread tension for the wheel under consideration can be ascertained as follows:

$$\text{Tread tension} = \frac{333 \text{ pounds}}{2 \sin 15°} = 640 \text{ pounds}$$

The angle subtended by adjacent strokes is used in the above equation, which is 15° for a wheel having 24 spokes.

FIGS. 3, 3a and 4 illustrate a second embodiment of the invention in the form of a wheel which is similar to the wheel described above but which is particularly well-suited for use in connection with a vehicle to be used in exploration of extra-terrestrial bodies. This second embodiment of the invention comprises a plurality of spokes 112 each consisting of a slender column pivotally connected at one end to a respective one of a plurality of lugs 122 which, as illustrated in FIG. 3a, are spaced about the periphery of a hub 124 that is integral with an axle 126. It can also be seen in FIG. 4 that the outer end of each spoke 112 is curved so that when the wheel is in its operable configuration a cleat 148 attached to each of said spokes is disposed substantially parallel to a surface supporting the wheel. A tread 152 extends peripherally around the ends of the spokes, the perimeter of this tread being of such size that the spokes are slightly bent when extended in their operable position, thus insuring further deflection of the spokes under loading within the Euler range of deflection. One end of each of a plurality of links 130 is pivotally connected to a connecting lug 128 integral with and medially located on each of the spokes 112, and the other end of each link is pivotally connected to one of a plurality of lugs 136 integral with and evenly spaced around the periphery of a sleeve, generally designated at 138, which is slidably mounted on the axle 126. The sleeve 138 is held in its operable position by means of a bolt 139 which passes through holes in the sleeve and the axle 126 and is secured with a nut 139a.

The spokes 112, links 130, sleeve 138 and the axle 126 and its integral hub 124 are preferably formed of a light, strong metal, such as an aluminum alloy. Other materials previously mentioned in the discussion of the first embodiment of the invention may also be used, including steel, fiberglass or sandwich honeycomb core materials. The cleat 148 is preferably made of hard rubber but may comprise any suitable material. As illustrated in FIGS. 3 and 4 the tread 152 comprises the same reticulated, foldable chain link material used as a tread for the first embodiment of the invention. A flexible wire mesh material or strong fabric may also be used for particular purposes of the wheel.

In FIG. 4 the collapsed configuration of the second wheel embodiment of the invention is illustrated by dotted lines. It will be recognized that the wheel can be placed in its operable configuration by moving the sleeve 138 toward the hub of the wheel, and that this movement requires the exertion of a force sufficient to bend each of the spokes 112 to its initial deflection under Euler loading. Since the force thus required to extend the spokes to an operable position may be considerable, it may be advantageous to provide some suitable means for moving the sleeve, such as, for example, a screw and crank means, lever arm, or a mechanical or hydraulic jack (none of which is shown).

FIG. 5 illustrates a vehicle generally designated at 200, which is adapted for exploration of extra-terrestrial bodies and equipped with wheels of the type represented in FIG. 4. In the figure dotted lines represent a nose cone 202 which is detachable from a rocket (not shown) used to transport the vehicle to an extra-terrestrial body and which may comprise the body of the vehicle. The axle 226 of each wheel is rotatably mounted in and driven by wheel drive members 254 which are in turn pivotally connected to support lugs 256 attached to the vehicle. As illustrated by dotted lines in the figure, the wheels in their folded configuration occupy a minimum of space in the rocket nose cone. The wheels can be quickly and conveniently put into use, however, by pivoting the wheel drive member 254 into a position in which the axles of the wheels are axially aligned, and by then extending the spokes as described in the preceding discussion of the second wheel embodiment of the invention. In some situations it may be necessary to lift the vehicle, as by use of jacks, to such a position that the spokes can be extended radially of their respective axle.

From the foregoing discussion it will be seen that a wheel constructed in accordance with the principles of the invention offers several important advantages, particularly with respect to uses which require a wheel of minimal weight combined with maximal storability and mobility. Since a wheel of the type described may have a larger diameter for a given weight than ordinary wheels, it possesses an increased ability to roll over large obstacles because of this factor alone. In addition, the action of the Euler loaded columns comprising the spokes of the wheel, which as noted above exert a relatively constant force against an irregular supporting surface irrespective of the amount of their deflection, provides a track-laying type rolling action which also greatly increases the ability of the wheel to roll over large obstacles. Furthermore, the construction of the wheel is such that the flexible tread and cleats attached to the ends of the spokes in each of the described embodiments of the invention will provide better traction on irregular surfaces than that provided by ordinary wheels, and through selection of particular materials for the tread and cleats, the wheel can readily be adapted for use on terrains of widely different characteristics. It will be recognized that a wheel constructed in accordance with the principles of the invention can, for example, be provided with steel tread and cleats, which will permit use on extremely hot, cold or jagged surfaces that would quickly damage wheels employing ordinary pneumatic tires. Another important advantage of the wheel lies in its ability to be folded mechanically, stored in a limited space, and returned to an operable configuration conveniently and without the need for tools other than, as noted above, a jack or other means for applying a sufficient force to bow the spokes of the wheel.

Although the invention has been described with respect to two novel and improved wheels, it is to be understood that the invention is not restricted in its utility to wheels but may be applied with efficacy, by means of other embodiments, to any purpose requiring a load bearing structure whose support elements individually act as zero-rate springs but collectively exert an incrementally increasing total force against a supporting surface as the load supported by said structure moves toward said surface.

Although the invention has been described and illustrated in detail, it is to be clearly understood that the same is by way of illustration and example only and is not to be taken by way of limitation, the spirit and scope of this invention being limited only by the terms of the appended claims.

What is claimed is:

1. A load bearing structure comprising:
    a base member having a plurality of support elements, each element comprising means for exerting a substantially constant resistive force in opposition to motion of said base member, and
    means for applying to said base member the constant resistive forces of increasing numbers of said elements as motion of said base member proceeds, whereby the total resistive force exerted by said elements increases with increase of load on said base member.

2. The structure of claim 1 wherein each support element comprises a slender column mounted on said base member and extending therefrom to effect resistance to said motion by bending stresses therein, each column having an Euler load substantially equal to the load to be supported by the column under a total load borne by the load bearing structure.

3. The structure of claim 1 including pre-loading means releasable upon said motion of the base for pre-loading each said element to its Euler load.

4. A collapsible wheel comprising:
   an axle, and
   a plurality of radially extending load-bearing spokes carried by a hub of the axle and foldable to a substantially parallel relation therewith said load-bearing spokes being capable of resiliently bowing in such a manner that their ends approach the hub of said axle under a load that is substantially perpendicular to said axle.

5. A collapsible wheel comprising:
   an axle,
   a plurality of load-bearing spokes each having one end pivotally connected to the axle in mutually spaced circumferential relation thereto, said load-bearing spokes being capable of resiliently bowing in such a manner that their ends approach the hub of said axle under a load that is substantially perpendicular to said axle,
   a sleeve slidably mounted on the axle,
   a plurality of links each having one end pivotally connected to the sleeve and the other end pivotally connected to one of the spokes, and
   a foldable tread of fixed length attached to the ends of the spokes remote from the axle.

6. A collapsible wheel comprising:
   an axle,
   a plurality of load-bearing spokes each mounted to the axle for motion between a first collapsed position and a second position extending substantially radially of the axle, said load-bearing spokes being capable of resiliently bowing in such a manner that their ends approach the hub of said axle under a load that is substantially perpendicular to said axle,
   means for maintaining the spokes in the second position, and
   means including the ends of the spokes for providing a circumferentially extending fixed length tread when the spokes are in the second position.

7. A collapsible wheel comprising:
   an axle having a hub at one end thereof,
   a plurality of slender elongated columnar element each having one end pivotally connected to the hub in space circumferential relation thereto and being bent in a plane containing the axle,
   a sleeve slidably mounted on the axle,
   a plurality of links each having one end pivotally connected to the sleeve and the other end pivotally connected to one of the columnar elements,
   a plurality of shoes each pivotally connected to one of the columnar elements at the end thereof remote from the axle,
   a foldable reticulated tread attached to the shoes and extending circumferentially around the ends of the columnar elements remote from the axle, and
   a plurality of cleats each attached to one of the shoes.

8. A collapsible wheel comprising:
   an axle;
   a plurality of radially extending load-bearing spokes carried by the axle and foldable to a substantially parallel relation therewith, each of the spokes comprising a bent column having an Euler load substantially equal to the load to be supported by the column under a total load borne by the wheel; and
   tread means connected with the spokes for pre-loading each spoke substantially to its Euler load in radially extended position.

9. A collapsible wheel comprising:
   an axle;
   a plurality of foldable spokes mounted on the axle;
   means for holding the spokes in an operable position extending radially of the axle;
   means on the spokes for providing a circumferentially extending foldable non-stretchable tread, each of the spokes comprising means for exerting a constant resistive force in opposition to motion of the end of the spoke remote from the axle toward the axle.

10. A collapsible wheel comprising:
    an axle;
    a plurality of spokes each having one end pivotally connected to the axle in mutually spaced circumferential relation thereto;
    a sleeve slidably mounted on the axle;
    a plurality of links each having one end pivotally connected to the sleeve and the other end pivotally connected to one of the spokes;
    a foldable tread of fixed length attached to the ends of the spokes remote from the axle, each of the spokes comprising means for exerting a constant resistive force in opposition to motion of the end of the spoke remote from the axle toward the axle.

11. A collapsible wheel as claimed in claim 10 wherein each of the spokes comprises a slender column having an Euler load substantially equal to the load to be supported by the column under a total load borne by the wheel.

12. A collapsible wheel comprising:
    an axle;
    a plurality of spokes each mounted to the axle for motion between a first collapsed position and a second position extending substantially radially of the axle;
    means for maintaining the spokes in the second position;
    means including the ends of the spokes for providing a circumferentially extending fixed-length tread when the spokes are in the second position, each of the spokes comprising means for exerting a constant resistive force in opposition to motion of the end of the element remote from the axle toward the axle.

13. A collapsible wheel as claimed in claim 12 wherein each of the spokes comprises a slender column having a Euler load substantially equal to the load to be supported by the column under a total load borne by the wheel.

References Cited by the Examiner

UNITED STATES PATENTS

| 52,422 | 2/1866 | Lane | 152—12 |
| 1,063,531 | 6/1913 | Glenn | 152—12 |
| 1,167,757 | 1/1916 | Hess | 152—11 |
| 1,371,462 | 3/1921 | Bassett | 301—47 |
| 3,069,021 | 12/1962 | Gray | 211—178 |

FOREIGN PATENTS 1,092   1906   Great Britain.

ARTHUR L. LA POINT, *Primary Examiner.*